United States Patent [19]

Mochida et al.

[11] 4,378,815

[45] Apr. 5, 1983

[54] PRESSURE CONTROL DEVICE WITH A FLUID DISCHARGE PREVENTION MECHANISM

[75] Inventors: Haruo Mochida; Michiaki Sasaki, both of Yokohama, Japan

[73] Assignee: Nissan Motor Co., Ltd., Yokohama, Japan

[21] Appl. No.: 250,001

[22] Filed: Apr. 1, 1981

[30] Foreign Application Priority Data

Apr. 7, 1980 [JP] Japan .................................. 55-44638

[51] Int. Cl.³ .............................................. F16K 17/36
[52] U.S. Cl. ..................................... 137/43; 137/493.2
[58] Field of Search ......................... 137/39, 43, 493.2

[56] References Cited

U.S. PATENT DOCUMENTS

| | | | |
|---|---|---|---|
| 1,893,942 | 1/1933 | Jensen | 137/43 |
| 2,016,278 | 10/1935 | Ehlers | 137/43 X |
| 2,770,666 | 11/1956 | Knight | 137/43 X |
| 3,738,384 | 6/1973 | Hall | 137/43 X |
| 3,929,158 | 12/1975 | Rodgers | 137/493.9 |
| 3,970,098 | 7/1976 | Boswank et al. | 137/43 X |
| 4,299,247 | 11/1981 | Keller | 137/43 |

FOREIGN PATENT DOCUMENTS

| | | |
|---|---|---|
| 2410321 | 9/1975 | Fed. Rep. of Germany . |
| 2503731 | 8/1976 | Fed. Rep. of Germany . |
| 2208387 | 6/1974 | France . |

Primary Examiner—Robert G. Nilson
Attorney, Agent, or Firm—Thompson, Birch, Gauthier & Samuels

[57] ABSTRACT

A pressure control device with a fluid discharge prevention mechanism such that operation is reliable, size is small, weight is light, and cost is low. The pressure control device according to the present invention comprises a novel valve body housing a weight and a fluid discharge prevention valve together, a vessel body with a tank-communicating port, and a lid with an atmosphere-communicating port. The top circumferential surface of the valve body serves also as a vacuum pressure regulation valve in cooperation with the vessel body.

5 Claims, 9 Drawing Figures

OUTLET

INLET 1 atm.

HIGH PRESSURE

LOW PRESSURE

PRESSURE CONTROL DEVICE WITH A FLUID DISCHARGE PREVENTION MECHANISM

BACKGROUND OF THE INVENTION

1. Field of the Invention

The present invention relates to a fluid pressure control device with a fluid discharge prevention mechanism used for a fuel tank having an air chamber, and more specifically to a novel and simple structure of the pressure control device, which is of a pressure vessel used with an automotive vehicle.

The fluid discharge prevention mechanism serves to prevent fuel from being discharged in an abnormal condition such as when the vehicle overturns.

2. Description of the Prior Art

The conventional pressure control device with a fluid discharge prevention mechanism usually comprises three separate chambers: a ball-housing chamber, a valve-housing chamber and an atmosphere-communicating chamber. This kind of construction has several faults. The basic problems are as follows:

(1) fuel condensed in the valve-housing chamber is easily discharged through the pressure control valve when pressure is applied thereto, since the valve housing is separate;

(2) a relatively great weight is required and the valve is closed only by a spring force, since the valve is normally kept open by the balance of the weight and the spring force;

(3) the number of necessary parts is relatively great;

(4) the shapes or profiles of the parts are complicated for a mass production process; and (5) the cost of the parts is relatively high.

A more detailed description of the prior-art pressure control device with a fluid discharge prevention mechanism will be made hereinafter under DETAILED DESCRIPTION OF THE PREFERRED EMBODIMENTS with reference to FIG. 1.

SUMMARY OF THE INVENTION

With these problems in mind, therefore, it is the primary object of the present invention to provide a pressure control device with a fluid discharge prevention mechanism such that valve operation is reliable, size is small, weight is light, and cost is low.

To achieve the above-mentioned object, the pressure control device with a fluid discharge prevention mechanism according to the present invention comprises a valve body to house together a weight and a fluid discharge prevention valve in communication with each other through a hole, a vessel body with a tank-communicating port, and a lid with an atmosphere-communicating port.

BRIEF DESCRIPTION OF THE DRAWINGS

The features and advantages of the pressure control device with a fluid discharge prevention mechanism according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
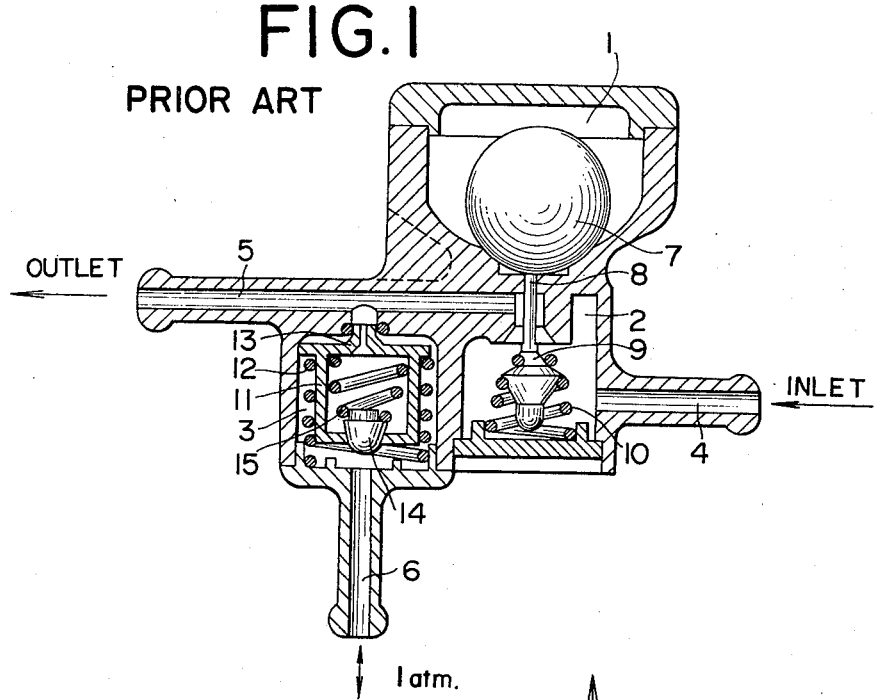
FIG. 1 is a cross-sectional view showing a prior-art pressure control device with a fluid discharge prevention mechanism.

To facilitate understanding of the present invention, a brief reference will made to a prior-art pressure control device with a fluid discharge prevention mechanism with reference to FIG. 1.

FIG. 1 shows a sample conventional pressure control device with a fluid discharge prevention mechanism. This device mainly comprises a ball-housing chamber 1, a valve-housing chamber 2, and an atmosphere-communicating chamber 3. The valve housing chamber 2 is located below the ball housing chamber 1 and the atmosphere-communicating chamber 3 is located next to the valve housing chamber 2. A fuel vapor inlet pipe 4 and a fuel vapor outlet pipe 5 communicate with the valve housing chamber 2, and an atmosphere-communicating inlet pipe 6 communicates with the atmosphere-communicating chamber 3. A valve 9 attached to a piston rod 8 is forced downward by the weight of a ball 7 in the ball-housing chamber 1 against the force of a spring 10 in order to open the passage between the fuel vapor inlet pipe 4 and the fuel vapor outlet pipe 5.

A valve body 11 housed within the atmosphere-communicating chamber 3 blocks a passage between the atmosphere-communicating chamber 3 and the fuel vapor outlet pipe 5 when a spring 12 provided outside the valve body 11 forces a pressure-regulation valve 13 upward. A vacuum pressure valve 14 is forced downward by a spring 15 provided within the valve body 11 in order to block a passage through the valve body 11 between the atmosphere-communicating chamber 3 and the fuel vapor outlet pipe 5.

In the prior-art pressure control device with a fluid discharge prevention mechanism thus constructed fluid discharge prevention is performed by using the ball-housing chamber 1 and the valve housing chamber 2, and pressure regulation is performed by using the atmosphere-communicating chamber 3. That is to say, when the valve 9 is positioned as shown in FIG. 1, since the valve 9 is forced downward by the weight of the ball 7, the fuel vapor flows from the fuel vapor inlet pipe 4 to the fuel vapor outlet pipe 5 through the valve housing chamber 2. If the vehicle is overturned, the position shown in FIG. 1 is reversed because of the weight of the ball. That is to say, the ball 7 falls away from the base of the ball-housing chamber 1 and therefore the valve 9 fitted to the piston rod 8 connected to the ball 7 is forced so as to block the passage between the valve housing chamber 2 and the fuel vapor outlet pipe 5. Thus, the valve 9 prevents fuel flowing from the tank side (not shown) through the fuel vapor inlet pipe 4 from flowing into the fuel vapor outlet pipe 5. If, for some reason, the pressure within the fuel vapor passage rises, the valve body 11 is forced downwards against the force of the spring 12 to allow the high pressure fluid to pass around the valve body 11. In contrast with this, if the pressure within the fuel vapor passage drops below atmospheric pressure, the vacuum pressure valve 14 within the valve body 11 is forced upward against the force of the spring 15 in order to apply atmospheric pressure thereinto up to a predetermined value.

In the prior-art pressure control device with a fluid discharge prevention mechanism however, since the fluid discharge prevention when the vehicle is overturned and the pressure regulation when the passage pressure is controlled are performed independently in two separate chambers under the control of the respective preset spring forces, there are several shortcomings such that the number of necessary parts is relatively great; the shapes or profiles of the parts are complicated for mass production, thus resulting in a higher production cost; the device itself is not compact and so on. In addition, since the valve housing chamber 2 is acts as the fluid discharge prevention mechanism, the vapor readily condenses therein into liquid form and flows out through the pressure regulation valve 13 when the pressure applied thereto rises. Further, since the prior-art fluid discharge prevention mechanism uses a weight as a gravity sensor and since the valve is normally opened by compressing the spring, it is not desirable to use a light weight and the valve is closed only by the spring force.

Figure 2:
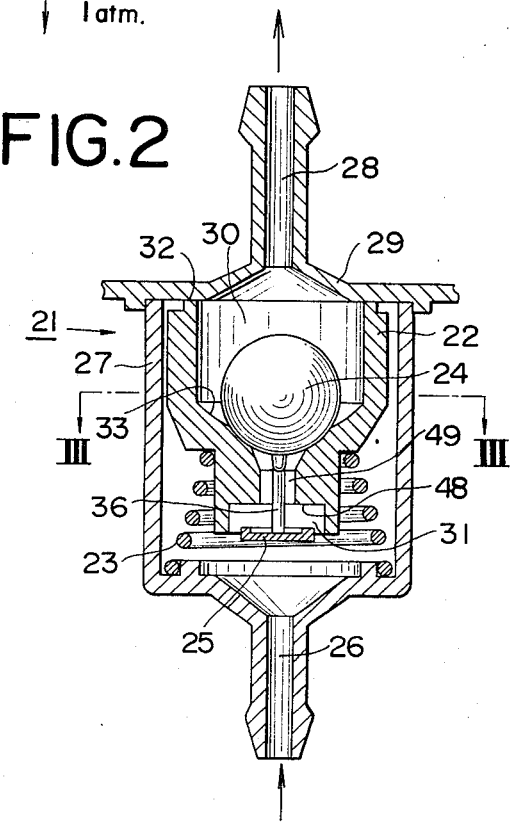
FIG. 2 is a cross-sectional view showing a pressure control device with a fluid discharge prevention mechanism according to the present invention.

In view of the above description, reference is now made to FIGS. 2 to 9, and more specifically to FIG. 2.

Figure 3:
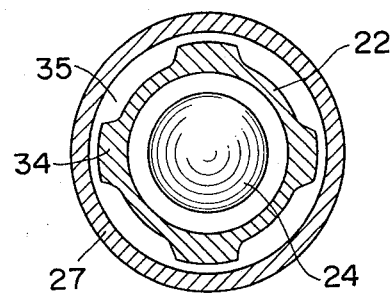
FIG. 3 is a cross-sectional plan view taken along the line III—III of FIG. 2.

FIG. 2 shows an embodiment of the pressure control device with a fluid discharge prevention mechanism according to the present invention. The pressure control device includes a valve body 22, a spring 23, a weight 24, and a fluid discharge prevention valve 25 within a vessel 21. The vessel 21 includes a vessel body 27 with a tank-communicating port 26 and a lid 29 with an atmosphere-communicating port 28. The valve body 22 includes a weight housing chamber 30 opening upwards to form a conical valve seat 33 and a valve housing chamber 31 opening downwards to provide a flat valve seat 48 with the chambers communicated with each other through a hole 49. The top circumferential surface 32 of the weight housing chamber 30 forms a vacuum pressure valve, and the conical surface 33 supporting the weight 24 forms the seat of a pressure-regulation valve. The slope angle of the conical surface is so predetermined as to be greater than the maximum slope angle considered to be possible when the vehicle is banked or parked on a slope. Vertical projections 34 are provided on the circumference of the valve body 22, as shown in FIG. 3, to form passages 35 between the vessel body 27 and the valve body 22. Although being shown as a ball in these figures, the weight 24 is required to be spherical in shape only at the portion in contact with the conical surface 33. A fluid discharge prevention valve 25 is fitted to a flexible connecting member 36 attached to a part of the spherical surface of the ball 7. A spring 23 is assembled within the vessel body 27; the valve body 22 is mounted on the spring 23; the lid 29 is placed to cover the vessel body 27; and the top surface 32 of the valve body 22 is brought into contact with the inner wall of the lid 29 around the atmosphere-communicating port 28 by the force of the spring 23.

Next follows an explanation of the operation of the pressure control device with a fluid discharge prevention mechanism according to the present invention.

Figure 4:
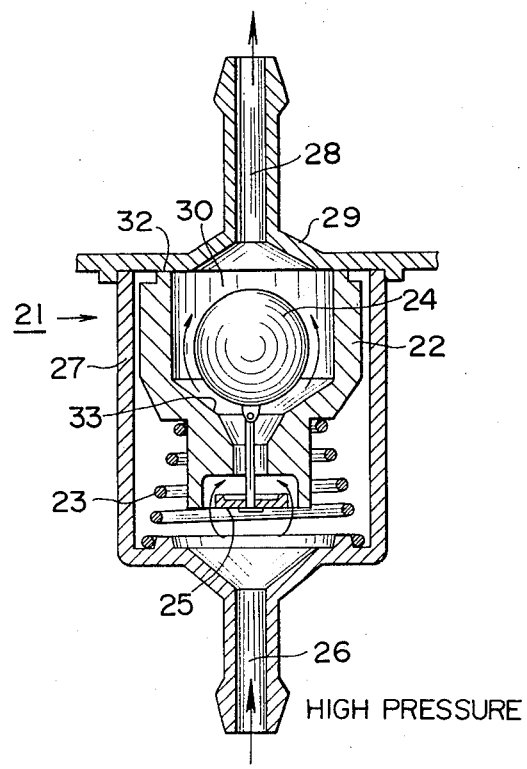
FIG. 4 and FIG. 5 are cross-sectional views to assist in the explanation of the device's operations.

The pressure is regulated by the force of the spring and the weight to retain the pressure in the tank within a predetermined pressure range. If the pressure in the tank lies in the predetermined range, the fluid discharge prevention valve 25 is open and the weight 24 and the vacuum pressure valve 32 is closed as shown in FIG. 2. If fuel vaporizes and the pressure in the tank exceeds a predetermined value, the vacuum pressure valve 32 is closed more tightly as shown in FIG. 4; the weight 24 operating as a pressure regulation valve is lifted upwards by fluid pressure against gravity; and the pressure relieves to atmosphere as shown by an arrow in FIG. 4. After that, when the pressure drops, the weight 24 is brought into contact with the conical surface 33, thus returning to the first position as shown in FIG. 2.

Figure 5:
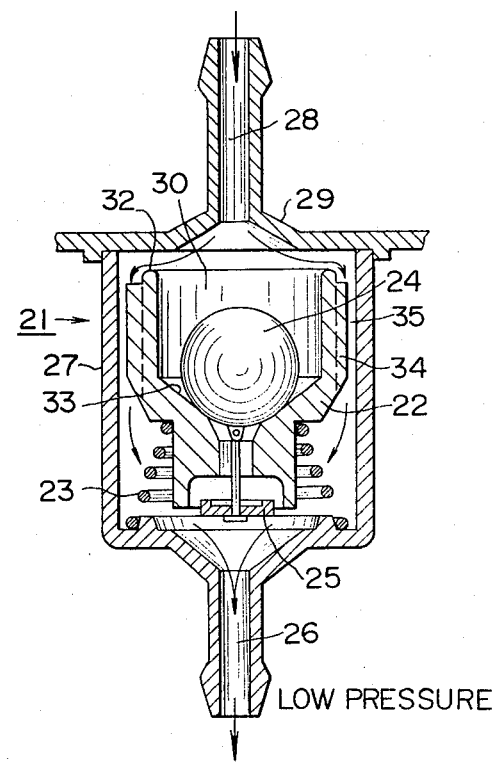

When the internal pressure in the tank falls below a predetermined pressure after the fuel has been consumed therein, the weight 24 forming the pressure regulation value is closed as shown in FIG. 5; air flows into the valve body 22 through the atmosphere communicating port 28; the valve body 22 is forced downward by the pressure against the force of the spring 23; the air flows into the tank-communicating port 26 by way of the passages 35 (see FIG. 3) and farther to the tank (not shown) to raise the pressure in the tank. When the internal pressure exceeds a predetermined value, the valve body 22 is returned upward by the force of the spring 23, thus the valve position is returned to the position shown in FIG. 2. As described hereinabove, the pressure is regulated within the tank.

Figure 6:
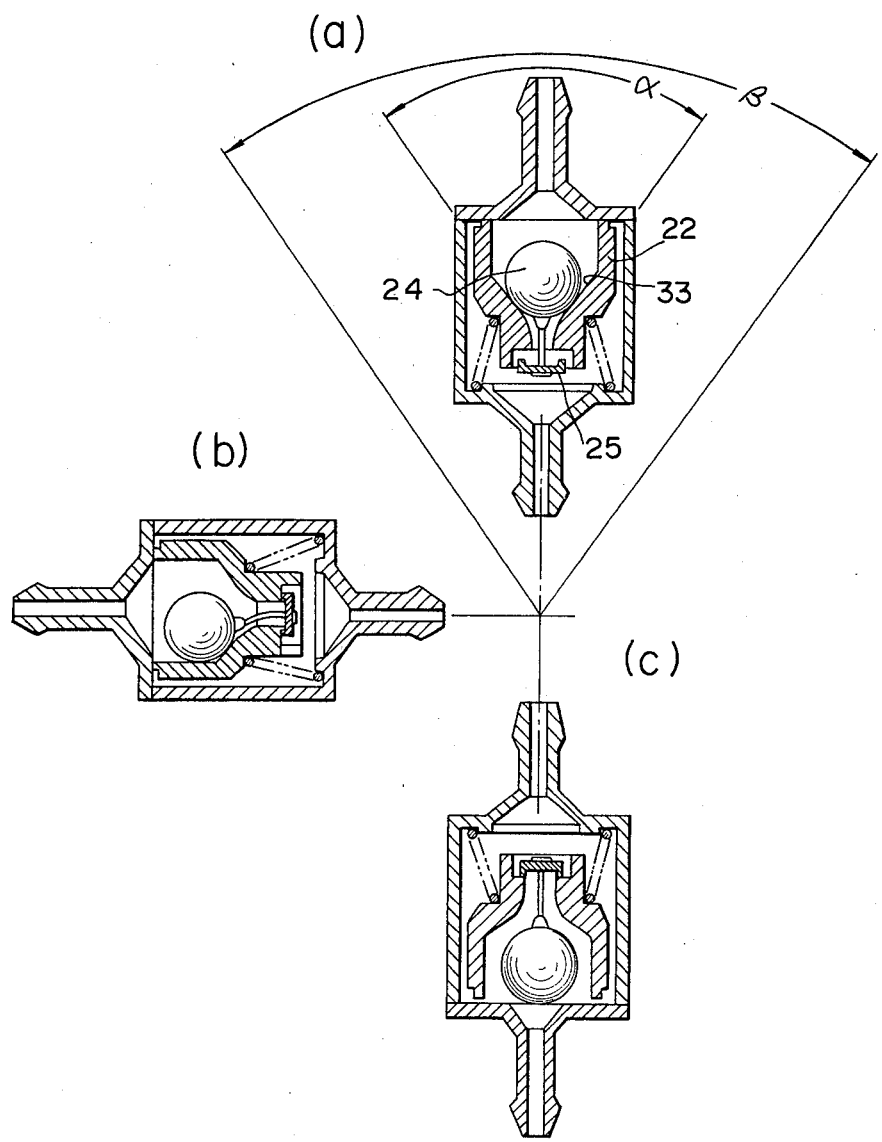
FIG. 6 and FIG. 7 are cross-sectional views of the fluid discharge prevention mechanism to assist in the explanation of the device's operations.
Figure 7:
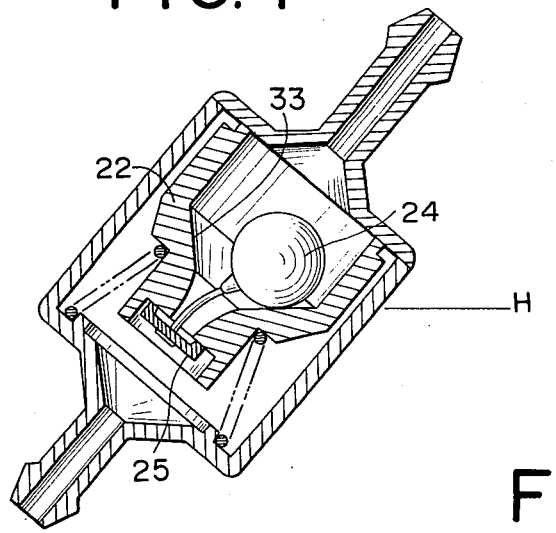

With reference to FIGS. 6 and 7, there follows an explanation of the fluid discharge prevention mechanism of the present invention. When the vehicle is left parked or travels along a flat road, the weight 24 is in contact with the conical surface 33 and the fluid discharge prevention valve 25 is kept open. The symbol $\beta$ shows a possible angle range within which the vehicle can be tilted while travelling or being left parked; the symbol $\alpha$ shows the angle made by the conical surface 33 of the valve body 22. When the angle $\alpha$ is predetermined to be equal to or less than the angle $\beta$, it is possible to retain the weight 24 so as to close the valve body 22. If the vehicle is tilted through more than the angle $\beta$ (the maximum parking angle), for example, if the vehicle rolls over as indicated in FIG. 6(b) or overturned as indicated in FIG. (c), the weight 24 slips away down the conical surface and hangs down to ensure that the fluid discharge prevention valve 25 closed and therefore to prevent fluid from being discharged.

FIG. 7 shows the case when the vehicle is travelling on a sharply curved road. In this case, even if the cone axis of the wall 33 is inclined, since the weight 24 is moved up the conical surface by its centrifugal force, the fluid discharge prevention valve 25 is closed to prevent fluid from being discharged.

Figure 8:
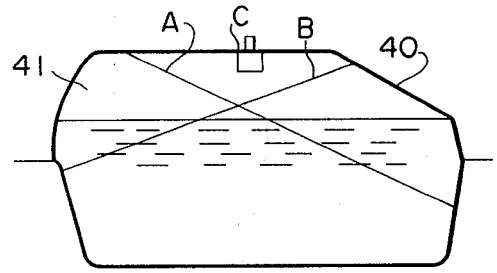
FIG. 8 is a pictorial view of the device installed within a fuel tank.
Figure 9:
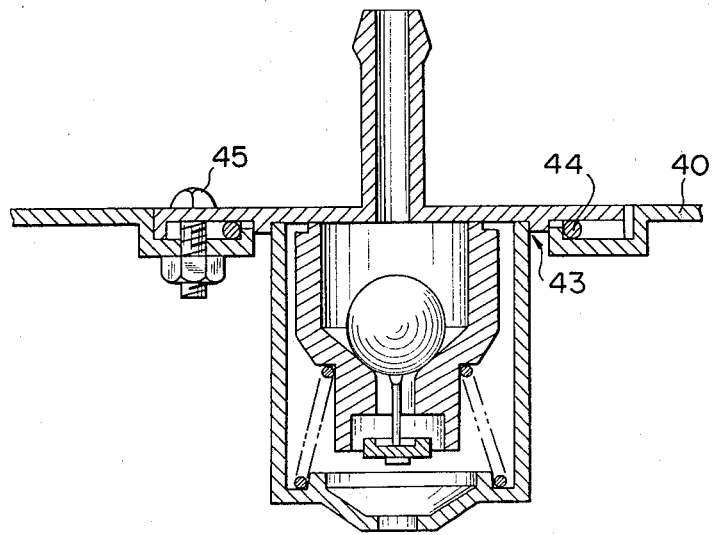
FIG. 9 is a fragmentary enlarged cross-sectional view of FIG. 8.

FIGS. 8 and 9 show an embodiment in which the pressure control device with a fluid discharge prevention mechanism is fixed within an air chamber 41 in a fuel tank 40. The fuel level of FIG. 8 shows the case where a maximum amount of fuel is stored, and an air chamber 41 is provided on the above the fuel. In the air chamber 41, the level varies from a maximum position A to another maximum position B depending upon the parked or travelling position of the vehicle. As depicted in FIG. 8, the device C according to the present invention is placed at an appropriate position where it is never immersed in the fuel.

FIG. 9 shows the condition where the device C is fixed to the tank 40. The pressure control device with a fluid discharge prevention mechanism C is fixed to the opening 43 in the tank 40 with an circular-section rubber ring 44 therebetween by the use of screws 45.

As described above, in the pressure control device with a fluid discharge prevention mechanism according to the present invention, since the weight and the fluid discharge prevention valve are connected to each other within the weight housing chamber and the valve housing chamber through a hole, and since the valve body is integrally formed within the vessel including the atmosphere communicating port and the tank communicating port, it is possible to provide a small-sized, lightweight, low-priced pressure control device.

In addition to the above features, even if the vehicle is rolled or overturned, the more the discharge pressure, the more tightly the valve will be closed, and it is possible to obtain reliable valve operation without leaking vaporized fuel. Further, since the device is small in size, it is possible to install it within the tank, thus allowing an additional effect such that the device is very safe in its maintenance and the prevention of accidents.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A pressure control device with a fluid discharge prevention mechanism, which comprises:
    (a) a vessel body having a tank-communicating port;
    (b) a lid having an atmosphere-communicating port, said lid being fixed to said vessel body to define a valve housing chamber;
    (c) a valve body having a weight housing chamber opening upwards to form a conical surface valve seat and a fuel discharge prevention valve housing chamber opening downwards to provide a flat valve seat, both valve seats being communicated with each other through a through hole, the top circumferential surface of said valve body being brought into contact with the inner surface of said lid when the pressure in the tank rises above a predetermined value, and is kept apart from the inner surface thereof to introduce atmospheric pressure thereinto when the pressure falls below a predetermined value;
    (d) a weight housed in the weight housing chamber formed in said valve body so as to be brought into contact with the conical valve seat when the pressure in the tank is below a predetermined value and be kept apart therefrom against its weight when the pressure therein is above a predetermined value;
    (e) a fuel discharge prevention valve housed in the fuel discharge prevention valve housing chamber formed in said valve body; and
    (f) a connecting member connecting said weight and said fuel discharge prevention valve integrally, said connecting member being placed through the through hole formed in said valve body, said fuel discharge prevention valve being urged against the flat valve seat formed in said valve body to prevent fluid from being discharged when said weight is moved on said conical seat formed in said valve body by action of gravity on said weight in case the pressure control device is inclined or overturned, or centrifugal force is applied to the device, whereby the pressure within the tank is regulated within a predetermined range and fuel discharge is prevented even in abnormal conditions.

2. A pressure control device with a fluid discharge prevention mechanism as set forth in claim 1, which further comprises a spring for urging said valve body toward the inner surface of said lid to regulate the vacuum pressure within the tank.

3. A pressure control device with a fluid discharge prevention mechanism as set forth in claim 1, wherein said connecting member is movable and flexible within the hole.

4. A pressure control device with a fluid discharge prevention mechanism as set forth in claim 1, wherein said weight is spherical in shape at least at the portion where said weight is in contact with the conical seat of said valve body.

5. A pressure control device with a fluid discharge prevention mechanism, comprising:
    (a) a vessel body having a tank-communicating port;
    (b) a lid having an atmosphere-communicating port, said lid being fixed to said vessel body to cooperate therewith in defining a first valve housing chamber communicating with both said tank-communicating port and said atmosphere-communicating port;
    (c) a valve housing body disposed in said first valve housing chamber for movement between a closed position contacting said lid and an open position spaced therefrom, said valve housing body having:
        (i) a weight housing chamber opening upwardly and including a conical valve seat;
        (ii) a second valve housing chamber opening downwardly and including a flat valve seat; and
        (iii) and intermediate passage connecting said weight housing chamber to said second valve housing chamber;
    (d) an integral valve assembly including a weight member joined to a fuel discharge preventing valve by a connecting member, said weight member, fuel discharge preventing valve and connecting member being located respectively in said weight housing chamber, said second valve housing chamber and said intermediate passage, said valve assembly being movable relative to said valve body between:
        (i) a first position at which said fuel discharge preventing valve is spaced from said flat valve seat and said weight member is seated by the force of gravity on said conical valve seat to block said intermediate passage and thereby cooperate with said valve housing body when the latter is in its closed position to isolate said tank-communicating port from said atmosphere-communicating port,
        (ii) a second position at which said fuel discharge preventing valve remains spaced from said flat valve seat and said weight member is unseated from said conical valve seat by fluid pressure received in said first valve housing via said tank-communicating port, thereby establishing a connection between said tank-communicating port and said atmosphere-communicating port via said second valve housing chamber, said intermediate passage and said weight housing chamber, and
        (iii) a third position at which said weight member is unseated from said conical valve seat and said fuel discharge preventing valve is seated against said flat valve seat to again block said intermediate passage, said valve housing body being movable to its open position when the pressure at said atmosphere-communicating port exceeds the pressure at said tank-communicating port by a given amount, thereby allowing said ports to communicate via said first valve housing chamber.

* * * * *